United States Patent [19]

Weinert

[11] Patent Number: 4,577,464
[45] Date of Patent: Mar. 25, 1986

[54] MULTIPLE POWER WHEEL ENGINE

[76] Inventor: Friedrich Weinert, 219-19 - 131st Ave., Jamaica, N.Y. 11413

[21] Appl. No.: 590,963

[22] Filed: Mar. 19, 1984

Related U.S. Application Data

[63] Continuation-in-part of Ser. No. 345,720, Feb. 24, 1982, abandoned, which is a continuation-in-part of Ser. No. 156,419, Apr. 20, 1982, Pat. No. 4,340,970.

[51] Int. Cl.[4] ............................................. F03G 7/06
[52] U.S. Cl. .................................................... 60/531
[58] Field of Search .......................... 60/527, 530, 531

[56] References Cited

U.S. PATENT DOCUMENTS 2,578,992  12/1951  Dickey .................................. 60/531
4,344,286   8/1982  Warner .................................. 60/531

*Primary Examiner*—Allen M. Ostrager
*Attorney, Agent, or Firm*—James P. Malone

[57] ABSTRACT

A heat engine. A plurality of body members each having a pressure chamber and a cooling chamber. A valve is mounted in each body member and adapted to connect and disconnect the pressure chamber and cooling chamber. A heat source is mounted in the pressure chamber and a ratchet operated pinion gear is connected to the pressure chamber. A not quite circular cam is mounted to operate the valves. The plurality of body members are mounted inside the cam to rotate about the center point of the cam whereby the pinion gears of the body members are connected to rotate a power output gear when the valve for each body member is in closed, heated position, and the pinion gear in each body member are disconnected from the power output gear when the valve in each body member is in open, cooling position. The heat source may be a radioisotopic heat element.

5 Claims, 6 Drawing Figures

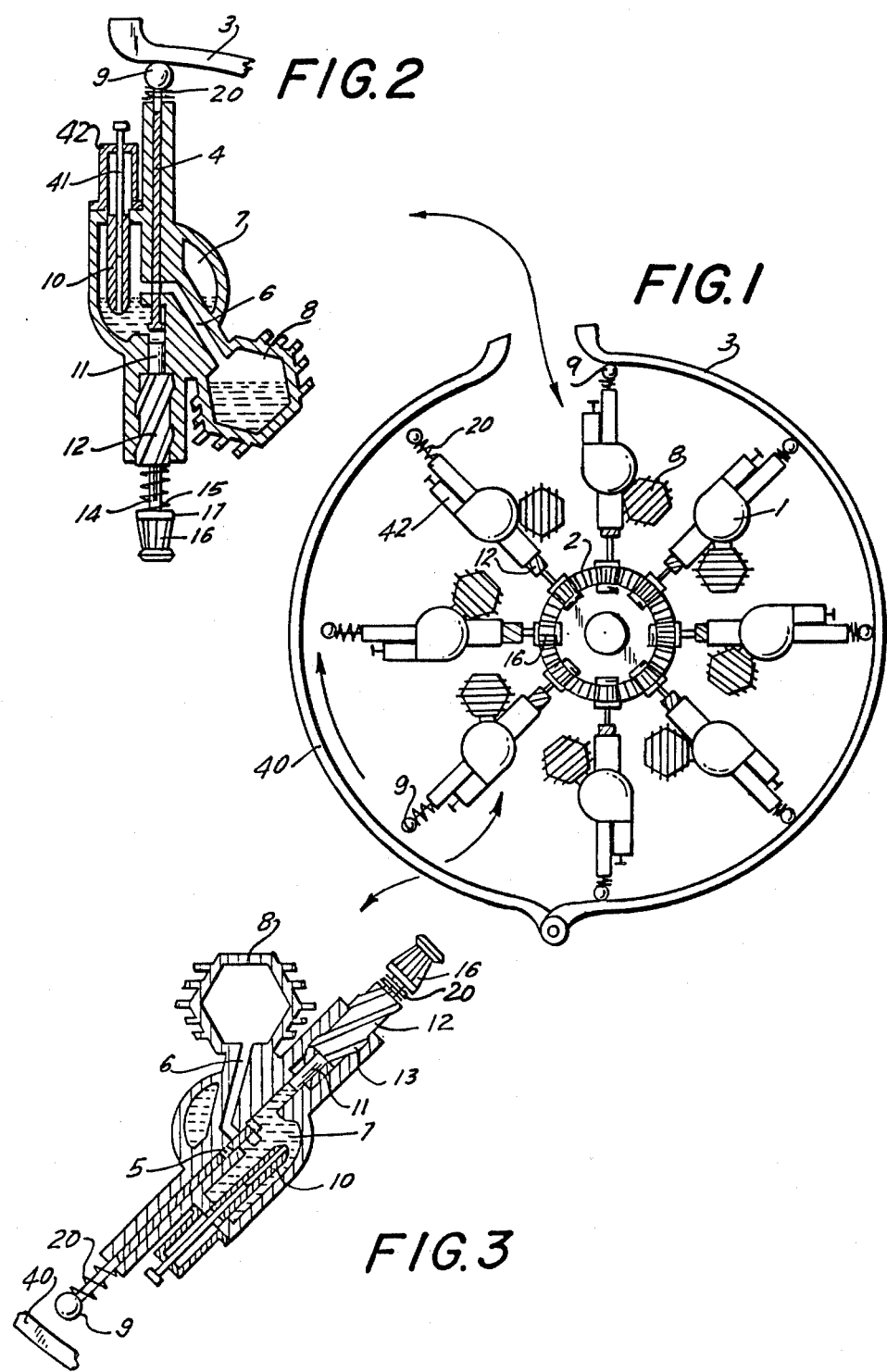

MULTIPLE POWER WHEEL ENGINE

This application is a continuation-in-part of Ser. No. 345,720 now abandoned filed Feb. 24, 1982, which is a continuation-in-part of Ser. No. 156,419, filed Apr. 20, 1982, now U.S. Pat. No. 4,340,970, granted on July 20, 1982.

BACKGROUND OF THE INVENTION

1. Field of the Invention:

The present invention relates to fluid engines which are activated by a heat source.

The heat source is centralized inside the engine in between the working fluid, therefore, no external fuel supply is needed as long as the heat source stays active. This is a very unique design with great potential, the machine operates in slow motion, there is no dead center involved, meaning no idling speed is needed to do physical work.

2. Prior Art:

Prior engines vary in efficiency by different R.P.M.s Not so with the present invention which can store the energy and use it when it is needed with almost the same efficiency regardless of the R.P.M. The present invention is a completely independent engine.

My prior patent entitled Power Wheel, U.S. Pat. No. 4,340,970, is designed for oceanic mining and therefore operates by a solid working fluid which does not change its phase. The present invention can operate with a phase changing fluid. Additionally, the valve functioning of the previous power wheel is controlled by gravitational force. Not so with the present invention which regulates valve functioning through a fixed cam installed around the circumference covering half of the action radius to move valve plungers by surface contact inwards against spring pressure, whereby the working fluid is channeled from the pressure cell into a cooling reservoir. This shortens the cooling off period and thereby increases the power output. The previous invention has no cooling reservoir and therefore no valve functioning because the housing of the expansion valves is exposed to the surrounding cold sea water, therefore, the present invention is an entire different design.

Moore, U.S. Pat. No. 3,549,490 and L. B. Borst, U.S. Pat. No. 3,127,321, describe nuclear reciprocating reactors activated by a critical mass and therefore includes complex cooling systems and utility systems which is quite different from the present multiple power wheel which does not operate on a nuclear critical mass or any other nuclear reactor system.

The present multiple power wheel is a heat engine introducing a new thermodynamic cycle, to bypass all outside controls and utility systems. The energy needed to activate the machine is an internal heat source, i.e., radio isotopic heat elements. Radio isotopic heat elements require no operator controls since they are inherently self regulating and will release energy steadily and effectively over the lifetime of the fuel.

Danish Pat. No. 34422 introduces a heat engine with gas expansion where the rotary motion is introduced by piston via connection rods and crank shaft which requires a large volume exchange by an external energy supply through the drive shaft of the engine. All three prior art references are completely different in design and functioning and cannot be compared to the present invention.

SUMMARY OF THE INVENTION

There has been a very great amount of development in the use and utilization of thermal energy, particularly during the past few years when the worldwide energy crisis has become apparent. All those developments in general improved existing prime movers but did not introduce a new cycle in thermodynamics whereby an engine can operate without external energy supply in the heat range of 800° F. Previous prime movers operate in the heat range of 2,000° F. Therefore, the present invention makes it possible to put radioisotopic heat elements into practical use for the industry. Radioisotopic energy emits heat out of a solid lump of isotopes.

The energy released from the Radio-Isotopic heat source does not require operator controls since it is inherently self regulating and will release energy steadily and effectively over the life time of the fuel. The leading candidate for isotopic energy is plutonium, cobalt, cerium and stronium. Compliance among these elements will produce a heat source of different life span. Stronium (SR-70) requires 28 years to reach half of the output power. This would mean that the use of nuclear waste produced by fission reactor would surpass the efficiency of the original nuclear fuel and therefore make the fusion reactor obsolete. I believe nuclear fusion could never be achieved on earth because lack of intense pressure as existing within the sun. Heat is only a by-product. Isotopic energy is non polluting to the environment as long as gamma rays are shielded. The nuclear fission generation would be benefited by recycling its own nuclear waste which would surpass the value of the original fuel. The power wheel in conjunction with self controlled valve units and radio isotopic heat can be built very compact, powerful enough to drive a vehicle or a vessel, therefore, organic or fossil fuel is no more needed among prime movers except in Aero and Chemical industries. This would mean an automobile equipped with this engine would be a one time investment with no further expense with the exception of minor accessories, additionally there is no noise or pollution involved. This would mean that mass transportation such as trains could be built to cover trans continental distance far more economical then marine and air transport. The drawing of the invention FIG. 6 shows a locomotive equipped with seven power wheels, each powered wheel containing eight expansion valves involving a total of fifty-six expansion valves, each valve able to produce one hundred horse power to a combined total of five thousand and six hundred horse power. This could be increased substantially by adding additional power wheels to the power shaft. Compared to other locomotives the power wheel driven locomotive is completely independent, no additional fuel supply or assistance from the outside is needed. Therefore, this train can run through a vacuumized tunnel with the speed of sound. Naturally, the tunnel is made from transparent material for sight seeing purposes. Because of this ability, governments will build transcontinental tunnels so a power wheel driven train with an accelerator booster as indicated in a patent disclosure called Pulsar Reactor, Ser. No. 338,276, filed Jan. 1, 1982, now abandoned, could cover transcontinental distances as far as South Africa through the African continent, through Europe into the U.S.S.R., Alaska and Canada, also the United States, Panama and South America. Comparing the cargo load of an airliner to a supersonic train, it is quite obvious which transportation system is more beneficial. Naturally, a supersonic train without consumption of organic or synthetic fuel is a possibility for the near future. The main objective is to have a heavy mass in motion at supersonic speed to reduce resistance, once the supersonic speed is reached.

The supersonic train is not only an improvement for the private industry but also for the military. For example, ballistic missiles are easy targets when placed in silos or moved about with conventional vehicles. Not so when moved with supersonic speed. Space missions will benefit from it as well when accelerating the space missile or capsule at supersonic speed on top of a supersonic train inside a vacuum tunnel which opens up before take off in such a fashion that the impact from the space missile with the atmospheric pressure would lift the space missile in lunging position as the missile is already traveling at the speed of sound. This would increase the payload of the missile and thereby reduce drastically the fuel consumption and increase the launching speed of a space vehicle, additionally nothing is wasted, every pice of mechanism can be used over and over again which makes a convoy take off into space possible, i.e., several space vehicles following each other in the same direction whereby the resistance of the following space vehicle is substantially reduced inside our atmosphere which is the biggest obstacle to overcome in a space lauch.

OBJECTS OF THE INVENTION

Accordingly, a principal object of the invention is to provide new and improved multiple power wheel engine.

Another object of the invention is to provide new and improved multiple power wheel engine having a radio isotopic heat source.

Another object of the invention is to provide new and improved heat engine comprising a plurality of body members each having a pressure chamber and a cooling chamber, a valve mounted in each body member and adapted to connect and disconnect the pressure chamber and cooling chamber, a heat source mounted in the pressure chamber, a pinion gear connected to the pressure chamber, a not quite circular cam is mounted to operate the valves, a power output gear adapted to mesh with the pinion gears, the plurality of body members being mounted inside the cam to rotate about the center point of the cam whereby the pinion gears of the body members are connected to rotate the output gear when the valve for each body member is in closed heated position, the pinion gear in each body member being disconnected from the output gear when the valve in each body member is in open, cooling position.

BRIEF DESCRIPTION OF THE DRAWINGS

FIG. 1 is a front plan view of the power wheel with expansion valves.

FIG. 2 is a schematic vertical sectional view of the expansion valve under contraction as shown in FIG. 1.

FIG. 3 is a schematic sectional view of expansion valve under expansion as shown in FIG. 1.

DESCRIPTION OF A PREFERRED EMBODIMENT

Figure 4:
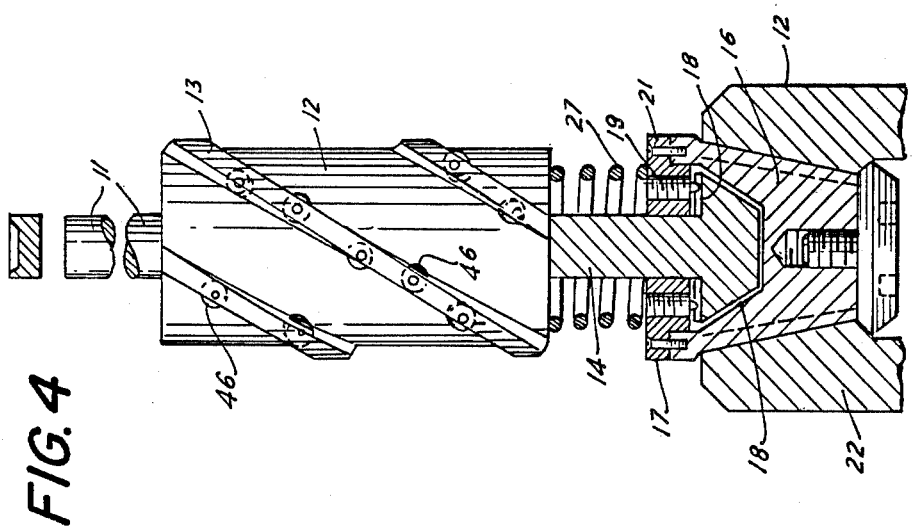
FIG. 4 is a schematic vertical sectional view of ratchet coupling with pinion gear joined in between two side gears.

Referring to FIG. 1 there is shown a front view of the present invention whereby a plurality of expansion valves (1) intermeshing with pinion gears (16) into side gear (2) called big wheel. A valve cam positioned around the outer circumference makes contact with a valve plunger (9) of each expansion rotation of the expansion valves which are fixed to each other. The cam is positioned on one side of the radius which automatically puts each expansion valve in an on or off position whereby position one is achieved when valve plunger (9) comes in contact with cam (3). This will open a cooling channel to make contact with the pressure cell thereby the working fluid runs out of the pressure cell into cooling reservoir (8) to reach relax stage. Once the valve plunger of the expansion valves moves off the track from the cam, spring (20) will move valve plunger outward and thereby close cooling channel to trap working fluid inside pressure cell which now expands because of the heat exposure inside the pressure cell which automatically moves piston and spindle bushing (12) outward which will rotate pinion gear (16) thereby moving all expansion valves around center axis. Meaning expansion valves pointing away from cam (3) are under expansion to introduce a work impulse as expansion valves in contact with cam (3) are under contraction called cool-off period of the working fluid.

FIG. 2 shows a more detailed cross section view of an expansion valve under contraction indicated by cam (3) which keeps valve plunger (4) in an inward position whereby slot (5) penetrating valve plunger matches the opening of pressure cell (7) and cooling channel (6) therefore working fluid of pressure cell (7) exits into cooling reservoir,, whereby spindle bushing (12) and piston (11) is moved by spring (14) into the pressure cell. The channeling of the working fluid from position one to position two allows to have a permanent heat source (10) installed inside the pressure cell. To stop all action heat element (10) has to be pulled out by push rod (41) of the pressure cell into storage cartridge (42).

FIG. 3 shows an expansion valve in second position meaning valve plunger (9) is off track from cam (40), therefore spring (20) moved valve plunger outward and thereby positioned slot (5) away from cooling channel (6) which automatically blockades passage from cooling channel (6) to pressure cell (7) therefore the working fluid now trapped in pressure cell (7) will expand by the heat exposure of heat element (10) which automatically moves piston (11) and spindle bushing outward to rotate pinion gear (16).

FIG. 4 shows piston (11) and spindle bushing (12) in a prospective view to show track rollers (46) positioned on each side of track surface to reduce resistance. The lower part shows in a cross section view how pinion gear (16) is positioned and intermeshing with side gear (22 and 2). The pinion gear is connected to a spindle bushing by a square bar stud sliding up or down inside the spindle bushing to accommodate the play of the spindle bushing. When the spindle bushing is moved downwards it rotates stud (14) which is interlinked with ratchet gear (18) by a ratchet pin (19) held in position by ratchet plate (21). The back stroke in position two disengages the ratchet gear and therefore no physical work can be achieved on position one. Atmospheric pressure and spring tension of spring (27) moves spindle bushing and piston upwards into pressure cell on position one.

Figure 5:
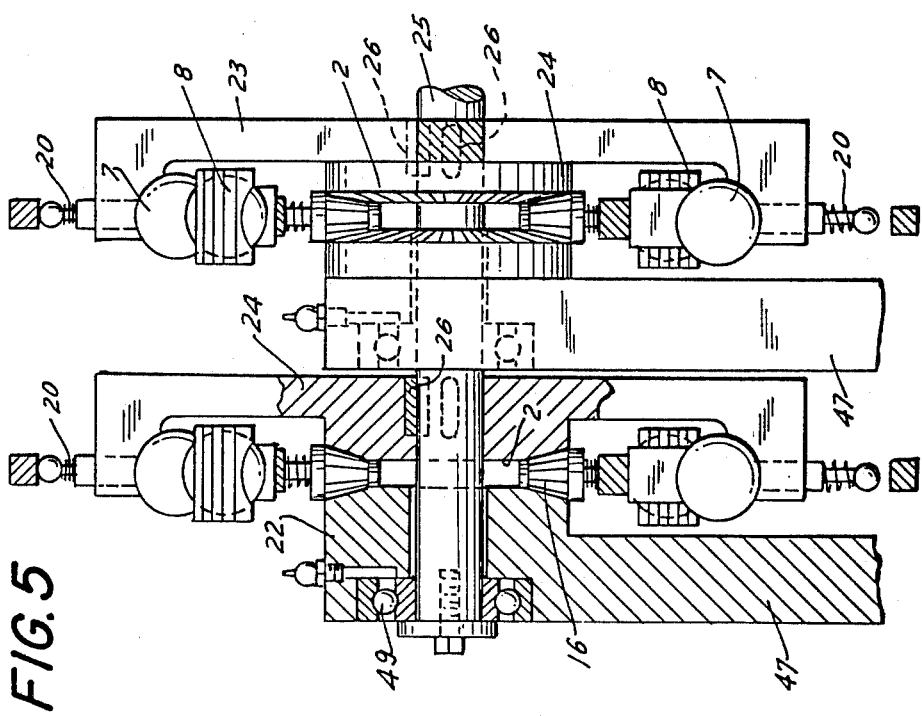
FIG. 5 is a partly sectional explanatory view of shaft connecting two power wheels according to the present invention.

FIG. 5 shows the installment of two power wheels to one shaft. Fixed frame (47) centralizing the shaft (25) by bearings (49) and stationary side gear (22) pinion gears (16) intermeshing with stationary side gear (22) and mobile side gear (24). Expansion valves are mounted radially in fixed position against mobile side gear (2) through traverse (24) whereby traverse is fixed to side gear (2) and locked to shaft (25) by key (26). In this position one can see on the upper part of the drawing cooling reservoir (8) in front of pressure cell (7). At the bottom of the drawing the situation is reversed meaning pressure cell (7) is now in front of cooling reservoir (8).

Figure 6:
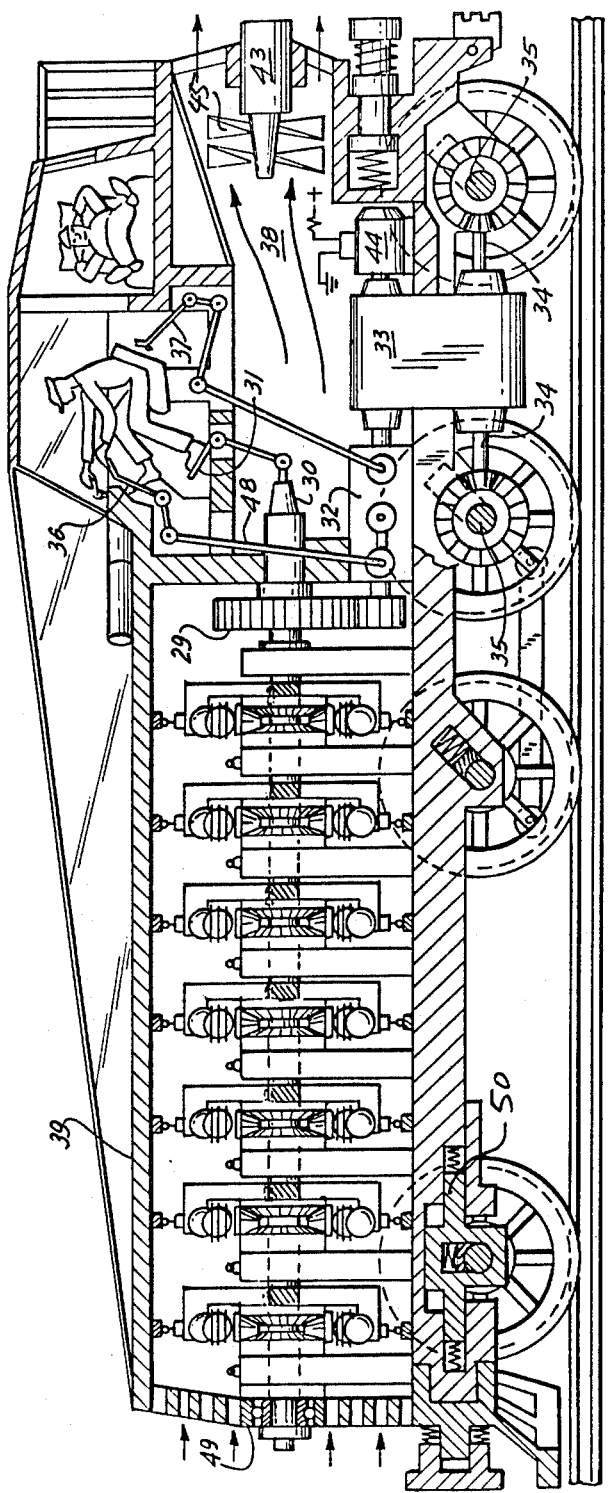
FIG. 6 is a partly sectional explanatory view of a series of multiple power wheels installed as prime movers in a locomotive.

FIG. 6 shows seven power wheels installed to one power shaft to drive a locomotive. The power shaft drives the main gear (29) which can be engaged through a clutch pressure plate (30) activated by foot pedal (31). The main gear drives the power shaft of gear box (32) which in return drives the differential gear (33) to rotate drive shaft (34) which activates wheel axel (35). The gears can be selected through shift linkage (48) as the reverse is shifted by reverse linkage (37) a generator (44) connected to one of the gears will drive an electric motor (43) to rotate fan plates (45) to create vacuum in air channel (38) to increase the flow of the incoming air through the front grill (49) under cover 39.

The locomotive shown in FIG. 6 is built dependable, long lasting and simple to repair. The power wheel drive cannot accelerate to supersonic speeds although the drawing of FIG. 6 shows the wheel suspension (35) for a supersonic locomotive. Therefore, the locomotive shown in FIG. 6 can be altered for supersonic speed by installing a liquid cooled pulsar reactor as explained in a separate patent disclosure, Ser. No. 338,276, filed Jan. 11, 1982, now abandoned. As stated before, a supersonic train must speed through a low pressure tunnel. A complete vacuum stage in the tunnel is not desired since air circulation is needed for cooling purposes. This invention is not only limited for vehicles but also very unique and practical as a mobile or stationary power plant.

It is claimed:

1. A heat engine comprising:
    (a) a plurality of thermal actuators mounted radially about an output shaft;
    (b) a gear means on said output shaft;
    (c) each thermal actuator having an output element consisting of a pinion gear capable of rotation when the actuator is in an energized state;
    (d) each pinion gear being selectively engageable with the gear means on said output shaft;
    (e) each thermal actuator comprising,
        (1) a heating element communicating with a pressure chamber,
        (2) a vaporizable liquid in said pressure chamber,
        (3) each output element extending into said pressure chamber and being actuated by vapor pressure within said pressure chamber,
        (4) a cooling chamber,
        (5) a valve member capable of establishing fluid communication between the cooling and pressure chambers in a first position, and closing communication between the chambers in a second position,
        (6) a valve actuator communicating with said valve member and extending out of the thermal actuator in a radial direction opposite that of the output element,
    (f) a circular cam means circumscribing the output shaft and the radially extending valve actuators,
    (g) each valve actuator being in operative engagement with the cam means during at least part of the cycle of the engine,
    whereby the operative engagement of the valve actuators with the cam means causes said valve members to alternately establish and disconnect the pressure chambers with the cooling chambers, such that alternating pressure pulses in said pressure chambers move said pinion gears on the output elements into operative engagement with the gear means on the output shaft while concurrently rotating said pinion gears to provide rotary motion to said gear means and the output shaft thereon.

2. Apparatus as in claim 1, each thermal actuator having a ratchet gear whereby the pinion gears on the thermal actuators are connected by means of the ratchet gears to rotate the gear means when the valve member for each thermal actuator is in closed, heated position, and the pinion gears on each thermal actuator are disconnected from the gear means when the valve member in each thermal actuator is in open, cooling position.

3. Vehicle propulsion means comprising a plurality of heat engines as in claim 1, the engines being connected to a common output shaft.

4. Vehicle propulsion means comprising a plurality of heat engines as in claim 2, the engines being connected to a common output shaft.

5. Vehicle propulsion means comprising a plurality of heat engines as in claim 1, said engines being connected to one drive shaft.

* * * * *